United States Patent [19]

Schawartz

[11] 3,890,379

[45] June 17, 1975

[54] PROCESS FOR THE PREPARATION OF D-(−)-2-AMINO-2-(P-HYDROXYPHENYL)-ACETIC ACID

[75] Inventor: Jozsef Schawartz, Budapest, Hungary

[73] Assignee: Chinoin Gyogyszer es Vegyeszeti Termekek Gyara RT, Budapest, Hungary

[22] Filed: Aug. 10, 1973

[21] Appl. No.: 387,284

[30] Foreign Application Priority Data
Aug. 11, 1972 Hungary ............................ CI 1262

[52] U.S. Cl. .......... 260/519; 260/465 D; 260/465 E
[51] Int. Cl. ......................................... C07c 101/06
[58] Field of Search ............. 260/519, 465 D, 465 E

[56] References Cited
UNITED STATES PATENTS
3,808,254   4/1974   Matthews ............................. 260/519

OTHER PUBLICATIONS
Organic Synthesis, Coll. Vol. 3, pp. 84–86, (1955).
Chemical Reviews, Vol. 42, pp. 231 & 232, (1948).

Primary Examiner—Robert Gerstl
Assistant Examiner—L. A. Thaxton
Attorney, Agent, or Firm—Karl F. Ross; Herbert Dubno

[57] ABSTRACT

A process for the preparation of D-(-)-2-amino-2-(p-hydroxyphenyl) acetic acid which comprises subjecting D-(-)-2-amino-2-(p-hydroxyphenyl)-acetonitryle-L(+)-hemitartarate to acidic hydrolysis and the D-(-)-2-amino-2-(p-hydroxyphenyl)-acetic acid.

2 Claims, No Drawings

PROCESS FOR THE PREPARATION OF D-/-/-2-AMINO-2-/P-HYDROXYPHENYL/-ACETIC ACID

The present invention is directed to a new and improved method for the preparation of D-(-)-2-amino-2-(p-hydroxyphenyl)-acetic acid and new intermediates useful in the preparation thereof.

It is known that D-(-)-2-amino-2-(p-hydroxyphenyl)-acetic acid may be used in the synthesis of pharmaceutical products, thus the drug having the commercial name Amoxycillin is prepared by acylating 6-aminopenicillanic acid with the above acetic acid derivative. (Brit. Med. Journ. 1. VII. 1972). For the preparation of D-(-)-2-amino-2-(p-hydroxyphenyl)-acetic acid (J. Chem. Soc. (C), 1920 (1971), the general preparative methods of the antipodes of amino acids described in the prior art are suitable. Thus according to the above reference the chinine salt of the N-carbo-benzyloxy-derivative of DL-2-amino-2-(p-hydroxyphenyl).-acetic acid is subjected to resolution, whereupon the protective group is removed by hydrogenation in the presence of a palladium catalyst. The yield is very low, about 10% with respect to the 4-hydroxy-benzaldehyde used. According to an other process (U.S. Pat. No. 3,489,751) the preparation of the desired compound is described with a yield of about 20-25% from 4-methoxy-benzaldehyde and using an enzymatic resolution of 2-(p-methoxyphenyl)-2-(chloroacetyl-amino)-acetic acid.

The above mentioned multistep procedures are lengthy and required the use of expensive auxiliary agents.

It has been found that the desired compound may be prepared by hydrolyzing D-(-)-2-amino-2-(p-hydroxyphenyl)-acetonitrile-L-(+)-hemitartarate.

According to the present invention, the hydrolysis of the salt is carried out in acidic medium. For this purpose mineral acids (such as hydrochloric acid) may be used. Hydrolysis may be promoted by heating. The salt obtained precipitates from the solution. The amino acid may be set free if desired from the salt by means of a base, e.g. an alkali metal hydroxide or ammonium hydroxide.

The hemitartarate starting material is not known from prior art and may be prepared from the corresponding substituted phenyl-aminoacetonitrile. The D-L-2-amino-2-(p-hydroxyphenyl)-acetonitrile has not been described in prior art either, and may be prepared by the method described in Houben-Weyl 8, 279-284. and may be split to the optical antipodes with the aid of L(+)-tartaric acid.

According to the present invention, there is also provided the above new starting material.

The formation of the hemi-tartarate is preferably carried out in an organic solvent, such as benzene, toluene, xylene, or esters, such as ethylacetate, butylacetate or ketones, such as methylethylketone, methylisobutylketone or alcohols (such as methanol, ethanol) or a mixture of these solvents, preferably a mixture of ethylacetate, benzene and methanol.

The advantage of our process is that the preparation of DL-2-amino-2-p-(hydroxyphenyl)-acetic acid is eliminated, resolution is carried out at an earlier stage of the synthesis and the end-product is obtained in higher yield and in a higher purity than according to the hitherto known methods.

Further details of the present invention are to be found in the following Examples.

EXAMPLE 1

In an apparatus equipped with a stirrer 106 g. of sodium bisulphite and 55 g. of ammonium chloride are dissolved in 200 ml. of water, whereupon a solution of 122 g. of 4-hydro-benzaldehyde, 80 ml. of ammonium hydroxide (specific gravity 0.904) and 100 ml. of water is added to the solution. After stirring, at 25°-28 °C for an hour a solution of 52 g. of sodium cyanide and 150 ml. of water is added and the mixture is stirred for 2 hours at 20°-25 °C. The mixture — which contains an oily-cloudy precipitate—is extracted with 1,250 ml. of ethylacetate in several portions, whereupon the solution containing the DL-2-amino-2-(p-hydroxyphenyl)-acetonitrile is diluted with 500 ml. of benzene. The benzene-ethylacetate solution is washed three times with 100 ml. of 25 % sodium chloride solution each and filtered. A solution of 130 g. of L-(+)-tartaric acid in 400 ml. of methanol having a temperature of 40 °C is added. The precipitation of crystals begins after 2-3 minutes. After standing for 40 hours, the crystalline mass is filtered, washed with 100 ml. of benzene-methanol mixture (1:1) and dried at 60 °C. Thus 72.45 g. of D-(−)-2-amino-2-(p-hydroxyphenyl)-acetonitrile-L-(+)-hemitartarate are obtained; $[\alpha]20/D = +40°$ (C=3, in water).

69.08 g. of the tartarate thus obtained are added to a 490 ml. of 22 % hydrochloric acid, which has been previously heated to 90 °C. The reaction mixture is allowed to stand at this temperature for 3 hours. The solution is stirred at a temperature between −5 °C and 0 °C for 3 hours, whereupon the precipitated amino acid hydrogen chloride is filtered off, dissolved in 80 ml. of water and the pH of the solution is adjusted to the value of 5 with 10 ml. of concentrated ammonium hydroxide. The precipitated amino acid is allowed to stand for several hours with cooling by ice, whereupon it is filtered, washed with cold water and dried at 80 °C. Thus 14.86 g. of D-(−)-2-amino-2-(p-hydroxyphenyl)-acetic acid are obtained; $[\alpha]20/D = −160°$ (C=1, in N hydrochloric acid).

What we claim is: claim:

1. A process for the preparation of D-(−)-2-amino-2-(p-hydroxyphenyl)-acetic acid comprising the following steps:

a. reacting 4-hydrobenzaldehyde with an aqueous solution containing sodium bisulfite, ammonium chloride, and ammonium hydroxide to yield a mixture;

b. reacting the mixture formed in step (a) with sodium cyanide to yield a precipitate;

c. extracting the precipitate formed in step (b) with ethyl acetate to produce DL-2-amino-2-(p-hydroxyphenyl)-acetonitrile;

d. reacting L-(+)-tartaric acid with the acetonitrile of step (c) in a reaction medium consisting of benzene, toluene, xylene, ethylacetate, butylacetate, methylethylketone, methybisobutylketone, methanol or ethanol, to crystallize therefrom D-(−)-2-amino-2-(p-hydroxyphenyl)-acetonitrile-L-(+)-hemitartarate;

e. treating the hemitartarate formed in step (d) with hydrochloric acid to form crystals of D-(−)-2-amino-2-(p-hydroxyphenyl)-acetic acid hydrogen chloride; and f. treating the hydrogen chloride with ammonium hydroxide to precipitate D-(−)-2-amino-2-(p-hydroxyphenyl)-acetic acid.

2. A process for the preparation of D-(−)-2-amino-2-(p-hydroxyphenyl)-acetic acid comprising the following steps:
   a. reacting 4-hydrobenzaldehyde with an aqueous solution containing sodium bisulfite, ammonium chloride, and ammonium hydroxide to yield a mixture;
   b. reacting the mixture formed in step (a) with sodium cyanide to yield a precipitate;
   c. extracting the precipitate formed in step (b) with ethyl acetate to produce a solution containing DL-2-amino-2-(p-hydroxyphenyl)-acetonitrile;
   d. reacting L-(+)-tartaric acid with the acetonitrile of step (c) in a reaction medium consisting of benzene, toluene, xylene, ethylacetate, butylacetate, methylethylketone, methylbisobutylketone, methanol or ethanol, to crystallize therefrom D-(−)-2-amino-2-(p-hydroxyphenyl)-acetonitrile-L-(+)-hemitartarate; and
   e. treating the hemitartarate formed in step (d) with hydrochloric acid to form crystals of D-(−)-2-amino-2-(p-hydroxyphenyl)-acetic acid hydrogen chloride.

* * * * *